United States Patent
Namba et al.

(10) Patent No.: US 12,504,563 B2
(45) Date of Patent: Dec. 23, 2025

(54) LENS WITH LENS BARREL

(71) Applicant: ALPS ALPINE CO., LTD., Tokyo (JP)

(72) Inventors: Hironori Namba, Miyagi (JP); Junya Ogata, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 562 days.

(21) Appl. No.: 17/658,155

(22) Filed: Apr. 6, 2022

(65) Prior Publication Data

US 2022/0326416 A1    Oct. 13, 2022

(30) Foreign Application Priority Data

Apr. 12, 2021    (JP) ................................. 2021-067267

(51) Int. Cl.
*G02B 5/00*    (2006.01)
*G02B 7/02*    (2021.01)

(52) U.S. Cl.
CPC .............. *G02B 5/003* (2013.01); *G02B 7/02* (2013.01)

(58) Field of Classification Search
CPC .......... G02B 5/003; G02B 7/02; G02B 7/021; G02B 7/022; G02B 7/027; G02B 27/0018; G02B 5/005; G02B 5/006; G02B 5/02; G02B 5/0205; G02B 5/021; G02B 5/0215; G02B 5/0221; G02B 5/0226; G02B 5/0231; G02B 5/0236; G02B 5/0242; G02B 5/0247; G02B 5/0252; G02B 5/0257; G02B 5/0268; G02B 5/0263; G02B 5/0273; G02B 5/0278; G02B 5/0284; G02B 5/0289; G02B 5/0294

USPC .......................................................... 359/738
See application file for complete search history.

(56) References Cited

U.S. PATENT DOCUMENTS

| | | | |
|---|---|---|---|
| 2005/0099703 A1 | 5/2005 | Hashimoto et al. | |
| 2015/0226931 A1 | 8/2015 | Huang | |
| 2020/0183058 A1* | 6/2020 | Shinohara | G02B 1/04 |
| 2022/0159158 A1* | 5/2022 | Smirnov | G02B 13/16 |
| 2022/0279097 A1* | 9/2022 | Mei | G02B 13/18 |

FOREIGN PATENT DOCUMENTS

| | | | |
|---|---|---|---|
| CN | 203759336 U | | 8/2014 |
| JP | H02281201 A | * | 11/1990 |
| JP | H03-271707 | | 12/1991 |
| JP | H0580240 | * | 4/1993 |
| JP | H0580240 A | * | 4/1993 |
| JP | 2005-92088 | | 4/2005 |
| JP | 2010-243659 | | 10/2010 |

OTHER PUBLICATIONS

Chinese Office Action for 202210372962.4 mailed on Jun. 7, 2023.
Japanese Office Action for 2021-067267 mailed on Oct. 22, 2024.

* cited by examiner

*Primary Examiner* — Henry Duong
(74) *Attorney, Agent, or Firm* — IPUSA, PLLC

(57) ABSTRACT

A lens with a lens barrel includes a metal lens barrel, a glass lens disposed in the metal lens barrel, and a glass light absorber disposed between an inner perimeter surface of the metal lens barrel and an outer edge of the lens in a radial direction of the metal lens barrel. A first temperature range from a deformation point to a softening point of a first glass material constituting the lens and a second temperature range from a deformation point to a softening point of a second glass material constituting the light absorber overlap each other.

6 Claims, 7 Drawing Sheets

LENS WITH LENS BARREL

CROSS-REFERENCE TO RELATED APPLICATION

The present application is based on and claims priority to Japanese patent application No. 2021-067267, filed Apr. 12, 2021, with the Japanese Patent Office, the entire contents of which are hereby incorporated by reference.

BACKGROUND OF THE INVENTION

1. Field of the Invention

The present invention relates to a lens with a lens barrel in which a lens is disposed within the lens barrel.

2. Description of the Related Art

In the fixing structure of the optical lens disclosed in Patent Document 1, a circular hole to accommodate lens is opened in a holder, the ring-shaped groove is formed in the inwardly-facing collar provided in the circular hole, and the incident side or exit side of the optical lens is bonded to the holder via an adhesive provided in the groove. Thus, in the structure in which the optical lens is fixed to the holder by adhesive, it achieves a fixed structure in which stress that causes wavefront aberration is not generated in the optical lens. [Patent Document 1] Japanese Patent Application Laid-Open No. H3-271707

SUMMARY OF THE INVENTION

For a camera lens or the like, it is undesirable that reflected light or scattered light is generated inside a lens, and in order to prevent reflected light or scattered light, a configuration is provided in which a coating is applied to the sides of the lens in black or the side surface of the lens is blackened. In addition, if it is necessary to decrease the incidence of light from outside the effective diameter of the lens, a coating in black may be applied to the area outside the effective diameter of the lens. Coating the lens in black and blackening are accomplished by painting, deposition, plating, or the like.

However, in order to apply a coating to a lens in black or blacken a lens, in addition to forming the lens, Coating the lens in black or blackening the lens is required in the manufacturing process. When such a process is introduced, the manufacturing process of the lens becomes complicated, and the cost incurred by introducing equipment for the process becomes a problem.

Furthermore, when a blackened lens is disposed in a lens barrel, the blackened lens is necessarily disposed in an air-tight manner in order to prevent the generation of new reflected light or scattered light in the lens barrel. However, in order to dispose the blackened lens in an air-tight manner without damaging the layer formed by coating the lens in black or blackening the lens, high accuracy is required in the manufacturing process.

Accordingly, an object of the present invention is to provide a lens with the lens barrel that can decrease the generation of reflected light or scattered light in the lens without providing an additional process, such as coating in black or blackening, to be air-tightly integrated with the lens barrel.

Means for Solving Problems

In order to solve the above-described problem, a lens with a lens barrel of the present invention includes a metal lens barrel, a glass lens disposed in the lens barrel, a glass light absorber disposed between an inner perimeter surface of the lens barrel and an outer edge of the lens in a radial direction of the lens barrel, wherein a first temperature range from a deformation point to a softening point of a first glass material constituting the lens and a second temperature range from a deformation point to a softening point of a second glass material constituting the light absorber overlap each other.

Accordingly, when the lens surface of the lens is formed, the shape of the light absorber can be processed, and positioning of the lens with respect to the lens barrel through the light absorber becomes possible. Accordingly, it is possible to obtain a lens with the lens barrel in which the lens surface is accurately positioned relative to the lens barrel and the lens barrel, the light absorber, and the lens are air-tightly integrated. Also, it is possible to decrease the reflected light and scattered light generated in the lens barrel without providing an additional process such as coating the lens in black or blackening.

In the lens with the lens barrel of the present invention, the overlapping temperature range is preferably 10° C. or higher. As a result, molding of the lens and the light absorber can be performed with high positional accuracy because the temperature range for molding the lens and the light absorber is not deviated from the suitable temperature ranges.

In the lens with the lens barrel of the present invention, a first glass transition point, which is the glass transition point of the first glass material, is preferably higher than a second glass transition point, which is the glass transition point of the second glass material. Accordingly, in the cooling process after the molding, even after the first glass material becomes less than or equal to the glass transition point and the lens is formed, the plastic deformation followed by the molding surface or the outer edge of the lens is continued at the end surface of the light absorber. Thus, a high shape transferability can be realized. For example, when a first glass material having a spherical shape or a configuration similar to a spherical shape is disposed and formed in a second glass material having an annular shape, the shape of the periphery of the lens is easily formed. Thus, the adhesion between the lens and the light absorber can be improved. On the other hand, in a method of forming a lens by heating and cooling a soft glass at a low temperature, a problem such as optical axis misalignment is likely to occur, especially when an aspheric lens is formed because the position of the lens surface cannot be controlled when the lens is fixed.

In the lens with the lens barrel of the present invention, a difference of a refractive index between the first glass material and the second glass material is preferably within ±2.5%. As a result, the light reflection at the boundary between the lens and the light absorber decreases. Therefore, light from the lens to the light absorber is easily transmitted to the light absorber, and optical absorption is appropriately performed within the light absorber. Therefore, the light reflection at the boundary decreases and the light that can be absorbed by the light absorber is reliably absorbed. Thus, generation of stray light and light that is harmful to return to the lens can be reduced.

In the lens with the lens barrel of the present invention, the lens preferably includes a lens surface on at least one of the end surfaces in the optical axis direction of the lens for exerting a predetermined refractive action. Accordingly, the lens, which is not necessary to control the light path due to a density gradient inside the lens, and/or the lens which is capable of controlling the light path by the lens surface, can be provided.

In the lens with the lens barrel of the present invention, a surface of the second glass material disposed such that the surface of the second glass material is continuous with the lens surface is preferably positioned between the lens surface and the lens barrel. Accordingly, the light absorber formed by the second glass material can be molded together with the lens formed by the first glass material.

In the lens with the lens barrel of the present invention, the lens preferably includes a central portion having the lens surface and a periphery disposed at an outer edge of the central portion in the radial direction of the lens, and a ratio of a thickness in the optical axis direction of the light absorber to a thickness of the periphery is preferably 0.8 or greater. Therefore, the light absorber formed by the second glass material can be molded together with the lens formed by the first glass material, and an adhesive strength between the light absorber and the lens barrel can be secured.

In the lens with the lens barrel of the present invention, the second glass material preferably includes an optical absorption band that is not present in the first glass material. Therefore, the light having the wavelength of the optical absorption band among the light incident on the lens can be absorbed in the light absorber, so that the generation of stray light can be reduced.

Accordingly, the present invention can provide the lens with the lens barrel that can decrease the reflected light and scattered light generated inside the lens barrel without providing an additional process and can provide the lens with the lens barrel that can be air-tightly integrated with the lens barrel.

DESCRIPTION OF THE PREFERRED EMBODIMENTS

<Configuration of Lens with Lens Barrel>

Figure 1A:
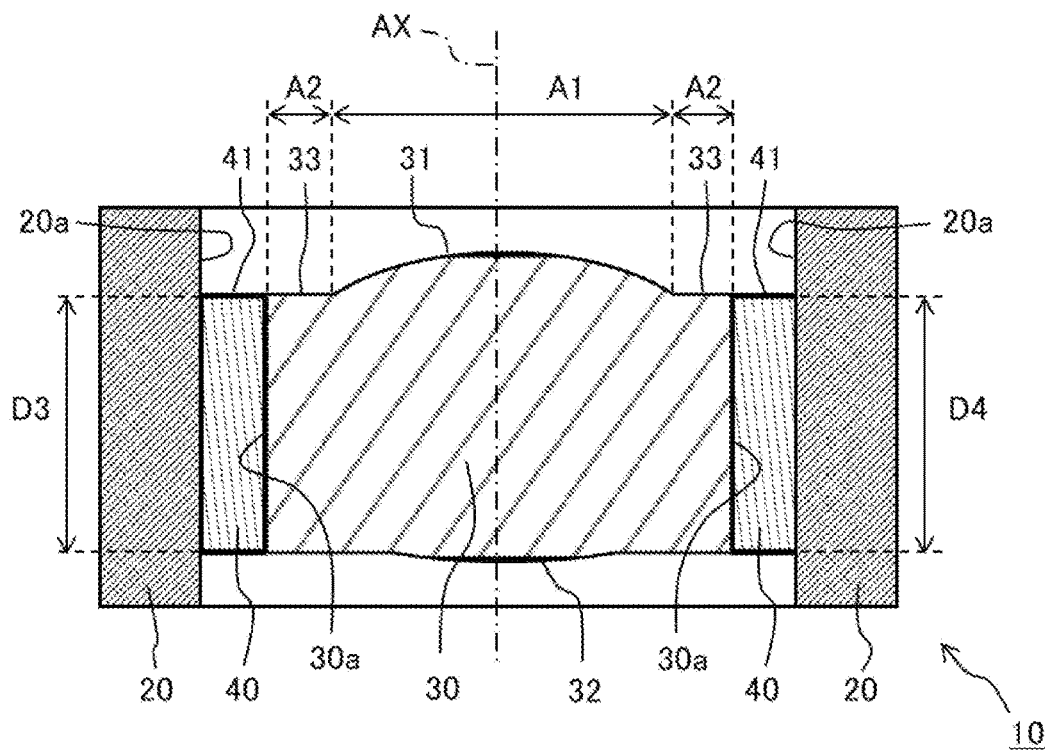
FIG. 1A is a cross-sectional view illustrating a configuration of the lens with the lens barrel of an embodiment of the present invention.
Figure 1B:
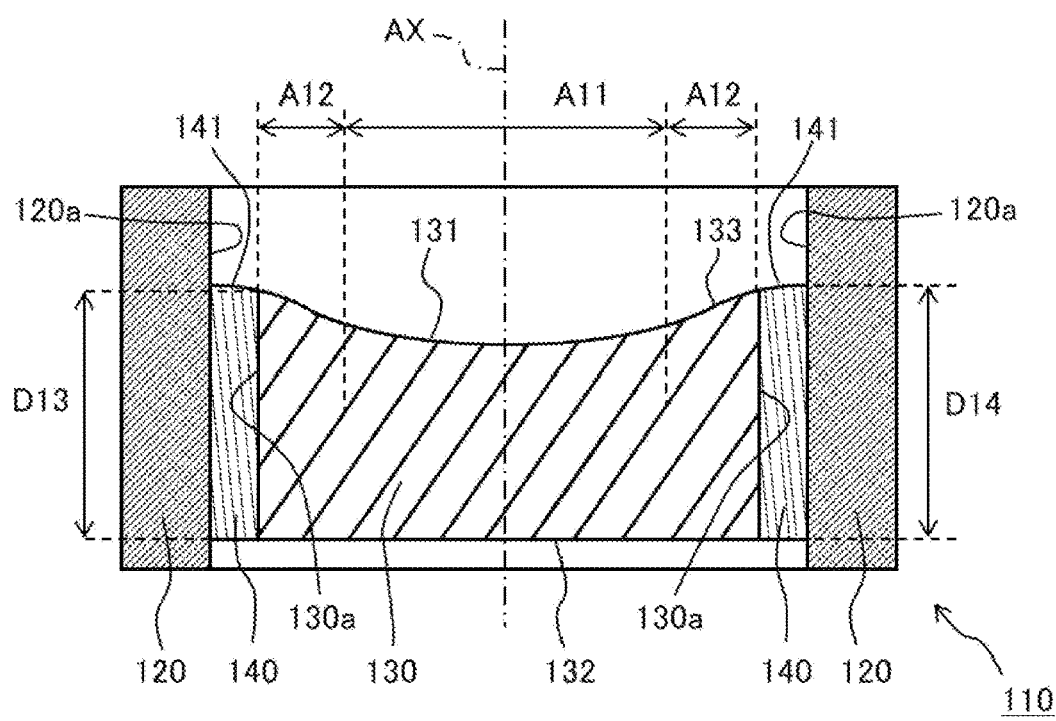
FIG. 1B is a cross-sectional view illustrating a configuration of the lens with the lens barrel of an embodiment of the present invention.

The configuration of the lens with the lens barrel of an embodiment of the present invention will be described in detail with reference to FIGS. 1A and 1B. FIG. 1A illustrates an example of a lens with a lens barrel 10 in which a lens 30 is a biconvex lens. FIG. 1B illustrates an example of a lens with a lens barrel 110 in which a lens 130 is a flat concave lens. FIG. 1A and FIG. 1B are cross-sectional views along an optical axis AX of the lenses 30 and 130. The lens with the lens barrel may have a lens having a shape other than that of FIG. 1A and FIG. 1B, for example, a flat convex lens or a biconcave lens, provided that at least one end surface of the optical axis direction of the lens has a lens surface that exerts a predetermined refractive action.

The lens with the lens barrel 10 illustrated in FIG. 1A includes the lens barrel 20, the lens 30 disposed inside the lens barrel 20, and the light absorber 40 disposed between the lens barrel 20 and the lens 30 in the radial direction of the lens barrel 20. The lens with the lens barrel 110 illustrated in FIG. 1B has a similar configuration with the lens with the lens barrel 10, including a lens barrel 120, a lens 130 disposed inside the lens barrel 120, and a light absorber 140 disposed between the lens barrel 120 and the lens 130 in the radial direction of the lens barrel 120.

<Lens Barrels 20 and 120>

The lens barrels 20 and 120 are made of metal in a hollow cylindrical shape and are formed by molding a metallic material. The metallic material constituting the lens barrels 20 and 120 is a material having a melting point higher than the softening point of the glass material used for the lenses 30 and 130 and the light absorbers 40 and 140, and for example stainless steel can be used.

<Lens 30>

The lens 30 illustrated in FIG. 1A is formed of glass and is disposed within the lens barrel 20 so as to share the optical axis AX with the lens barrel 20. The lens 30 has two lens surfaces 31 and 32 exerting a predetermined refractive action on both ends across the optical axis AX. The two lens surfaces 31 and 32 form outwardly protruding convex surfaces in the optical axis AX direction. Accordingly, the lens 30 forms a biconvex lens. The two lens surfaces 31 and 32 may be either spherical or aspherical. Here, in the optical axis AX direction, the first lens surface 31 of the lens 30 is called an upper side, and the second lens surface 32 is called a lower side.

The lens 30 has a shape that is rotationally symmetrical with respect to the optical axis AX and has a central portion A1 having two lens surfaces 31 and 32 and a periphery A2 provided on the outer edge of the central portion A1 in the radial direction with respect to the optical axis AX. The periphery A2 has an outer edge 30a as an outer peripheral surface facing an inner perimeter surface 20a of the lens barrel 20. The periphery A2 has a constant thickness D3 in the optical axis AX direction.

<Lens 130>

The lens 130 illustrated in FIG. 1B is formed of glass and is disposed within the lens barrel 120 so as to share the optical axis AX with the lens barrel 120. The lens 130 has a lens surface 131 that exerts a predetermined refractive action on one end surface across the optical axis AX. The other end surface of the lens 130 is a flat surface 132. The lens surface 131 has an inwardly concave surface in the optical axis AX direction. Thus, the lens 130 forms a flat concave lens. The lens surface 131 may be either spherical or aspherical.

The lens 130 has a shape that is rotationally symmetrical with respect to the optical axis AX and has a central portion A11 having the lens surface 131 and a periphery A12 provided at an outer edge of the central portion A11 in the radial direction with respect to the optical axis AX. The periphery A12 has an outer edge 130a as an outer peripheral surface facing an inner perimeter surface 120a of the lens barrel 120. The thickness of the periphery A12 increases in the optical axis AX direction as it moves away from the optical axis AX and has a maximum thickness D13 at the outer edge 130a.

<Light Absorber 40>

The light absorber 40 illustrated in FIG. 1A is formed of glass and is provided between the inner perimeter surface 20a of the lens barrel 20 and the outer edge 30a of the lens 30. The light absorber 40 has a constant thickness D4 in the optical axis AX direction. The thickness D4 of the light absorber 40 is the same as the thickness D3 of the periphery A2 of the lens 30. An upper end surface 41 of the light absorber 40 is coplanar with an upper end surface 33 of the periphery A2 and is continuous with the lens surface 31 between the lens surface 31 and the inner perimeter surface 20a of the lens barrel 20.

<Light Absorber 140>

The light absorber 140 illustrated in FIG. 1B is formed of glass and is provided between the inner perimeter surface 120a of the lens barrel 120 and the outer edge 130a of the lens 130. The thickness of the light absorber 140 increases in the optical axis AX direction as it moves away from the optical axis AX and has a maximum thickness D14 at the inner perimeter surface 120a of the lens barrel 120. An upper end surface 141 of the light absorber 140 forms a curved surface with an upper end surface 133 of the periphery A12 and is continuous with the lens surface 131 between the lens surface 131 and the inner perimeter surface 120a of the lens barrel 120.

<Glass Materials>

A first glass material, which is a glass material constituting the lenses 30 and 130, has a glass transition point, a deformation point, and a softening point, and has a first temperature range as a temperature range from the deformation point to the softening point.

A second glass material, which is a glass material constituting the light absorbers 40 and 140, also has a glass transition point, a deformation point, and a softening point, and has a second temperature range as a temperature range from the deformation point to the softening point.

The first temperature range of the first glass material and the second temperature range of the second glass material have an overlap. The differential between an upper limit and a lower limit of the overlap is defined as an overlapping temperature range. The overlapping temperature range is preferably 10° C. or higher. Therefore, the lens barrel can be simultaneously formed in a state where a raw material 30m of the lens 30 and a raw material 40m of the light absorber 40 are both put into the lens barrel 20, because these materials have the overlapping temperature range as described above (see FIG. 4). Accordingly, the positioning of the lens 30 with respect to the lens barrel 20 can be accurately performed through the light absorber 40, and the lens with the lens barrel 10 having a high positioning accuracy of the lens surface 31 with respect to the lens barrel 20 can be obtained. The same applies to the lens 130 illustrated in FIG. 1B. Hereinafter, the lens with the lens barrel 10 illustrated in FIG. 1A will be described by way of an example. However, the same shall apply to the lens with the lens barrel 110 illustrated in FIG. 1B, unless otherwise described. In order to further facilitate obtaining the lens with the lens barrel 10 having the high positioning accuracy of the lens surface 31 with respect to the lens barrel 20, the overlapping temperature range is preferably 20° C. or higher and particularly preferably 50° C. or higher.

In contrast, when the overlapping temperature range is less than 10° C., the deviation of the temperature ranges that are capable of molding the first glass material and the second glass material becomes large. Therefore, the lens 30 and the light absorber 40 are not easily formed simultaneously in the lens barrel 20 from a raw material 30m of the lens 30 and a raw material 40m of the light absorber 40. Accordingly, the above process increases the difficulty of positioning the lens 30 with respect to the lens barrel 20 through the light absorber 40.

When a material having the first glass transition point higher than the second glass transition point of the second glass material is selected as the first glass material used for the lens 30, the inner surface shape of the light absorber 40 is formed along the outer edge 30a of the periphery A2 of the lens 30 when the first glass material is disposed inside the second glass material and formed. As a result, the adhesion between the lens 30 and the light absorber 40 can be increased.

Furthermore, the second glass material is relatively more deformable than the first glass material. Therefore, in the cooling process, the temperature of the first glass material drops to equal to or less than the glass transition point, and the lens 30 is deformed so as to follow a first optical surface 51c of the upper mold 51. However, at the end surface 41 of the light absorber 40, plastic deformation continues so as to follow a lower surface 51b (molding surface) of the upper mold 51. Further, the plastic deformation of the inner perimeter surface 42 of the light absorber 40 continues so as to follow the shape of the outer edge 30a of the lens 30. Therefore, the shape transferability can be increased.

In contrast, in the process of heating and cooling at a low temperature using a soft glass such as soda lime glass, the position of the lens surface 31 cannot be controlled when the lens 30 is fixed to the lens barrel 20. Therefore, a problem such as light axis misalignment is likely to occur, especially in the case of aspherical lens.

The difference of a refractive index between the first glass material and the second glass material is preferably within ±2.5%. As a result, the light reflection at the boundary between the lens 30 and the light absorber 40 can be reduced. Particularly, stray light which is generated by the reflection of light from the lens 30 toward the light absorber 40 at the boundary and the return of the light to the lens 30 can be reduced, and the light to the light absorber 40 can be reliably absorbed. From the viewpoint of obtaining such optical effects in a more stable manner, the above difference in refractive index is preferably within ±1.5% and particularly preferably within ±0.5%.

As described above, the light absorber 40 is disposed between the inner perimeter surface 20a of the lens barrel 20 and the outer edge 30a of the lens 30. When the raw material 30m of the lens 30 and the raw material 40m of the light absorber 40 are disposed within the lens barrel 20 and formed integrally, a predetermined shape having the lens surface 31 of the lens 30 and a continuous end surface 41 is formed. This shape prevents stray light that is harmful to an image focused by the lens 30 from returning to the lens 30 by reflecting light from the lens 30 toward the light absorber 40 at the boundary or by reflecting light incident on the light absorber 40 at the inner perimeter surface 20a of the lens barrel 20. In addition, as in the case of a conventional lens with a lens barrel, it is not necessary to apply an additional process, such as blackening or the like, to the lens before assembling the lens to a holder, such as a lens barrel.

As illustrated in FIG. 1A, the thickness D3 of the periphery A2 of the lens 30 along the optical axis AX direction is constant, and the thickness D4 of the light absorber 40 along the optical axis AX direction is constant. The thickness D3 of the periphery A2 and the thickness D4 of the light absorber 40 are the same as each other, and the end surface 33 and the end surface 41 are coplanar.

Meanwhile, in the lens with the lens barrel 110 illustrated in FIG. 1B, in the direction along the optical axis AX, the periphery A12 of the lens 130 is thickened so as to approach the lens barrel 120, and the maximum thickness D13 is formed at the boundary portion between the periphery A12 of the lens 130 and the light absorber 140. The light absorber 140 is also thickened in the direction along the optical axis AX so as to approach the lens barrel 120 and has a maximum thickness D14 at the boundary portion between the inner perimeter surface 120a of the lens barrel 120 and the light absorber 140. The maximum thickness D14 of the light absorber 140 is larger than the maximum thickness D13 of the periphery A12 of the lens 130.

The relationship between the thickness of the periphery of the lens and the thickness of the light absorber is not limited to the relationship illustrated in FIGS. 1A and 1B. The ratio of the thickness in the direction of the optical axis AX of the light absorber to the thickness of the periphery of the lens is preferably 0.8 or greater. Accordingly, in the lens with the lens barrel 10 illustrated in FIG. 1A, adhesion strength between the lens 30 and the light absorber 40 to each other can be sufficiently secured. In addition, the light absorber 40 can reliably absorb light from the central portion A1 toward the periphery A2 of the lens 30, and an image can be formed in the lens 30 while decreasing stray light. These effects are obtained in the lens with the lens barrel 110 illustrated in FIG. 1B.

The second glass material of the light absorber 40 has an optical absorption band not present in the first glass material of the lens 30. For example, when the second glass material has an optical absorption band capable of absorbing light in a region having a longer wavelength than visible light, the light absorber 40 can absorb light having a longer wavelength than visible light among the light that is incident on the lens 30 and reduce the light having the wavelength region in a focused image.

The first glass material and the second glass material may also have optical absorption bands capable of absorbing light in different wavelength ranges from each other. For example, if ultraviolet light is absorbed by the first glass material and infrared light is absorbed by the second glass material, imaging can be performed by the lens 30 with reduced ultraviolet light and infrared light.

<Manufacturing Process of Lens with Lens Barrel>

Figure 2:
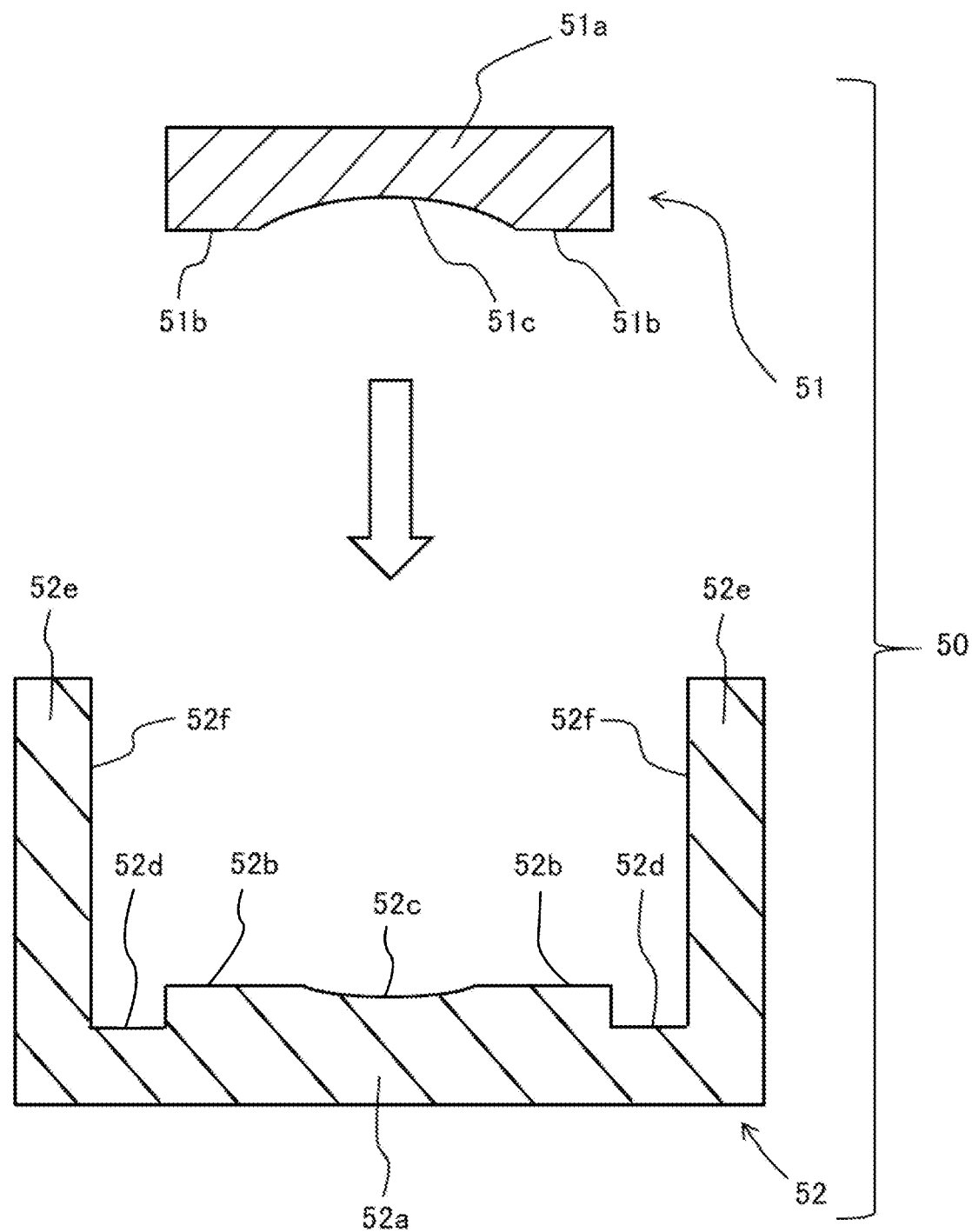
FIG. 2 is a cross-sectional view illustrating a mold configuration of an embodiment of the present invention.

Next, a manufacturing process of the lens with the lens barrel 10 will be described. The lens with the lens barrel 10 is manufactured using a mold 50 having an upper mold 51 and a lower mold 52 as illustrated in FIG. 2.

The upper mold 51 has a mold 51a that is substantially disc-shaped. The upper mold 51 has a first optical surface 51c as a curved concave surface corresponding to the first lens surface 31 of the lens 30 at the center of a lower surface 51b facing the lower mold 52.

The lower mold 52 has a bottom wall 52a that is substantially disc-shaped. The lower mold 52 has a top surface 52b facing the bottom surface 51b of the upper mold 51 at the bottom wall 52a. The lower mold 52 has an optical surface 52c as a curved concave surface corresponding to the second lens surface 32 of the lens 30 at the center of a top surface 52b.

The bottom wall 52a has an annular recess 52d which is recessed downwardly along the outer periphery of its top surface 52b. Further, in the outer portion of the bottom wall 52a, a side wall 52e upwardly extends in a hollow cylindrical shape, that is, the side wall 52e extends toward the upper mold 51. The side wall 52e is connected to the annular recess 52d, and an inner perimeter surface 52f has an inner diameter corresponding to the outer peripheral surface 20b of the lens barrel 20.

Figure 3:
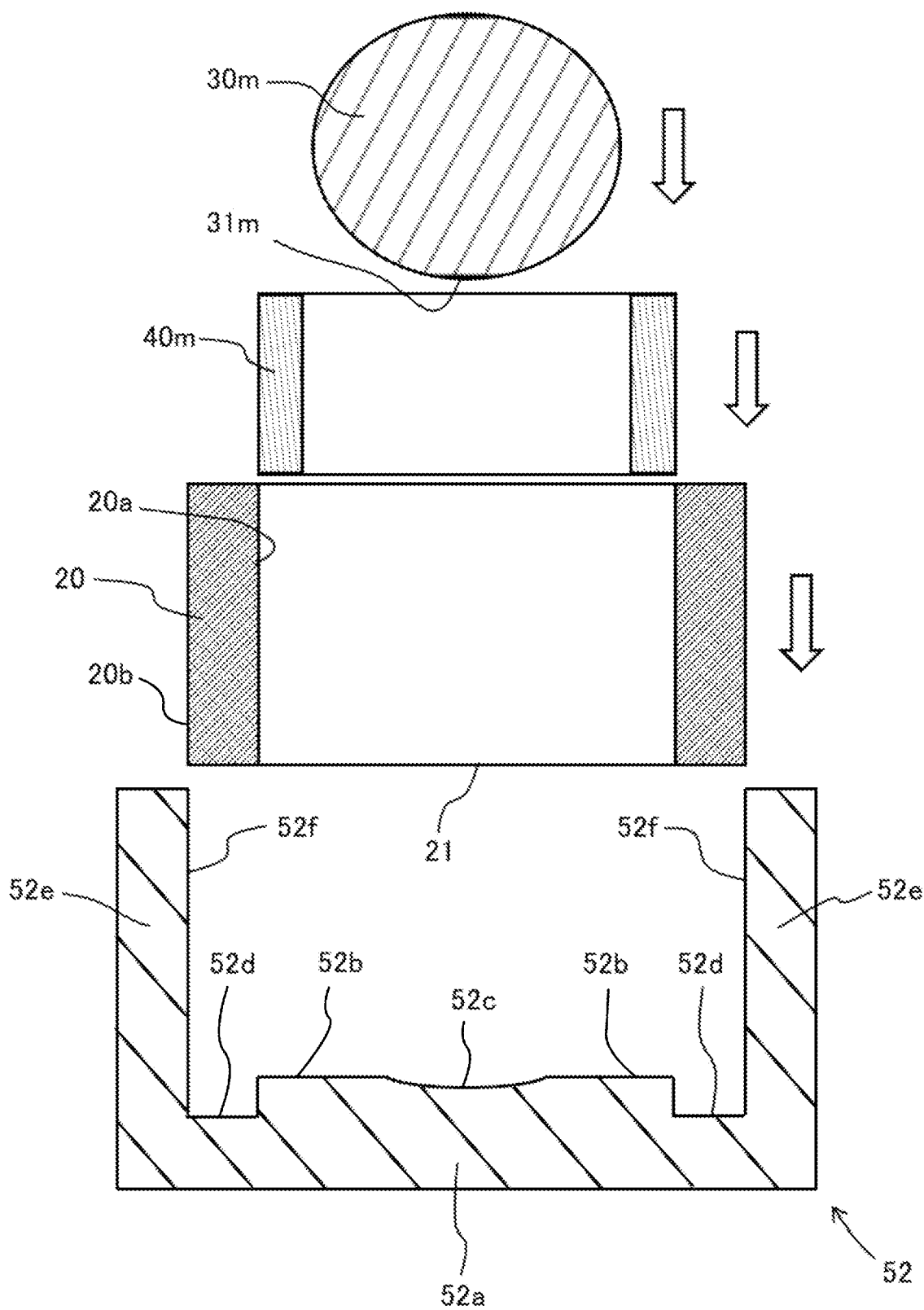
FIG. 3 is a cross-sectional view illustrating a process of putting the lens barrel, a raw material of the lens, and a raw material of the light absorber into a lower mold illustrated in FIG. 2.
Figure 4:
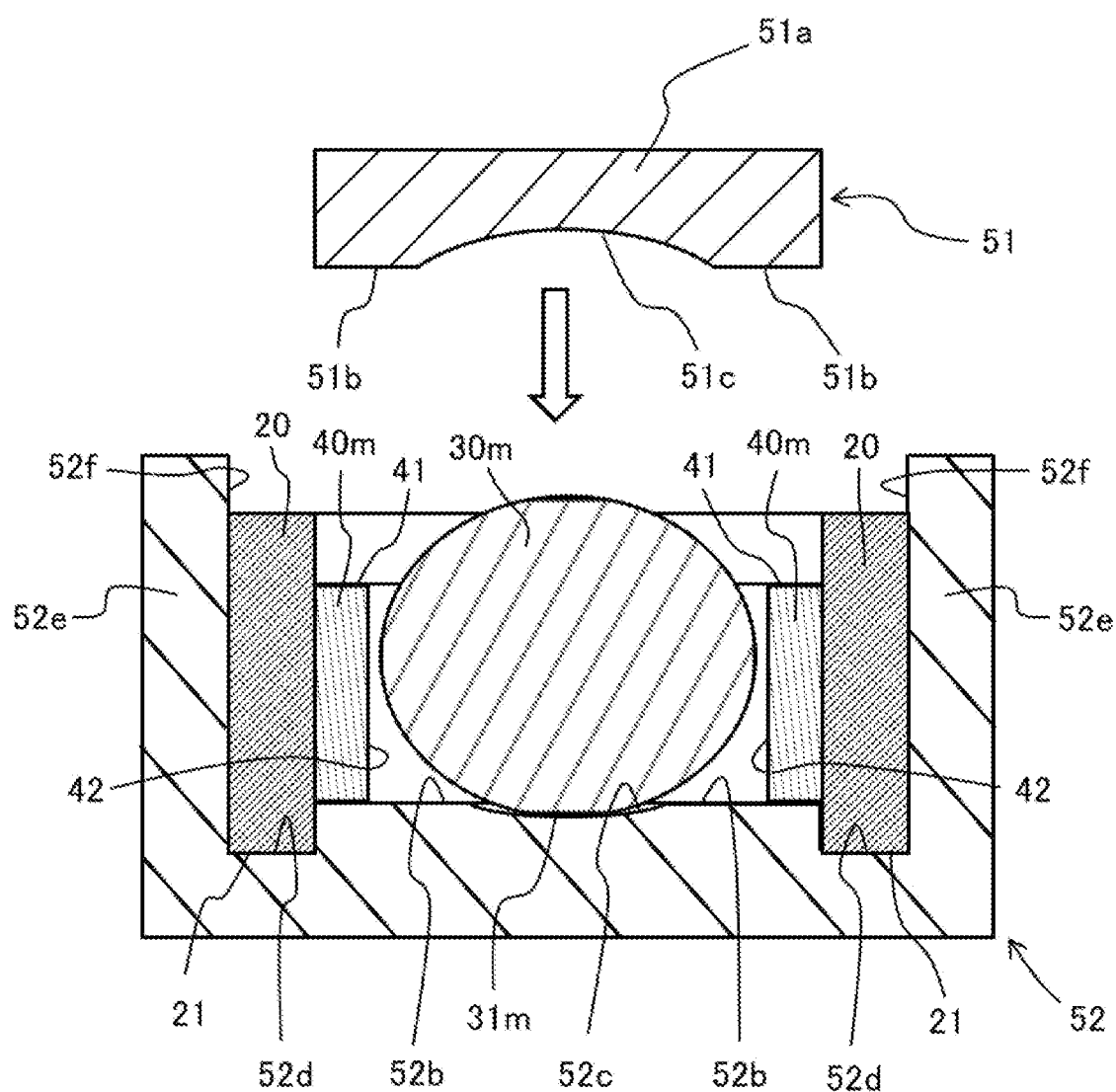
FIG. 4 is a cross-sectional view illustrating a process of putting the lens barrel, the raw material of the lens, and the raw material of the light absorber into the lower mold illustrated in FIG. 2 and molding with an upper mold.

As illustrated in FIGS. 3 and 4, the lens barrel 20, the raw material 30m of the lens 30, and the raw material 40m of the light absorber 40 are put into the lower mold 52. The lens barrel 20 is inserted into the lower mold 52 by sliding the outer peripheral surface 20b on the inner perimeter surface 52f, and the outer periphery of the bottom surface 21 is disposed in the annular recess 52d of the lower mold 52.

On the inside of the lens barrel 20, the raw material 40m of the light absorber 40, which is a hollow cylindrical shape, is disposed. On the inside of the raw material 40m, the raw material 30m of the lens 30, which is spherical or three-dimensionally similar to a sphere, is disposed. The raw material 30m is positioned so that a bottom center 31m of the raw material is positioned on the second optical surface 52c of the lower mold 52 (see FIG. 4).

In the state illustrated in FIG. 4, the raw materials 30m and 40m are plastically deformed by pressing the raw materials 30m and 40m in the lower mold 52 by lowering the upper mold 51 under a temperature in an overlap between the deformation point and softening point of the first glass material and between the deformation point and softening point of the second glass material. Accordingly, the lens 30 and the light absorber 40 are simultaneously formed.

As described above, the first glass material and the second glass material have an overlapping temperature range of 10° C. or higher from the deformation point to the softening point of these materials. Therefore, the shape of the light absorber 40 can be processed by the first optical surface 51c of the upper mold 51 and the second optical surface 52c of the lower mold 52, when the lens surfaces 31 and 32 of the lens 30 are formed, and the positioning of the lens 30 with respect to the lens barrel 20 through the light absorber 40 can be realized. Therefore, a lens with a lens barrel having a high positioning accuracy of the lens surfaces 31 and 32 with respect to the lens barrel 20 can be obtained. In addition, as with conventional lenses, there is no need for additional process, such as blackening or the like, in order to provide the optical absorption function, and thus the manufacturing process is not complicated. Then, in the light absorber 40, stray light generated by reflection of the light incident on the lens 30 at the inner perimeter surface 20*a* of the lens barrel 20 can be prevented from becoming light that is harmful to form an image by the lens.

Example 1

Figure 5A:
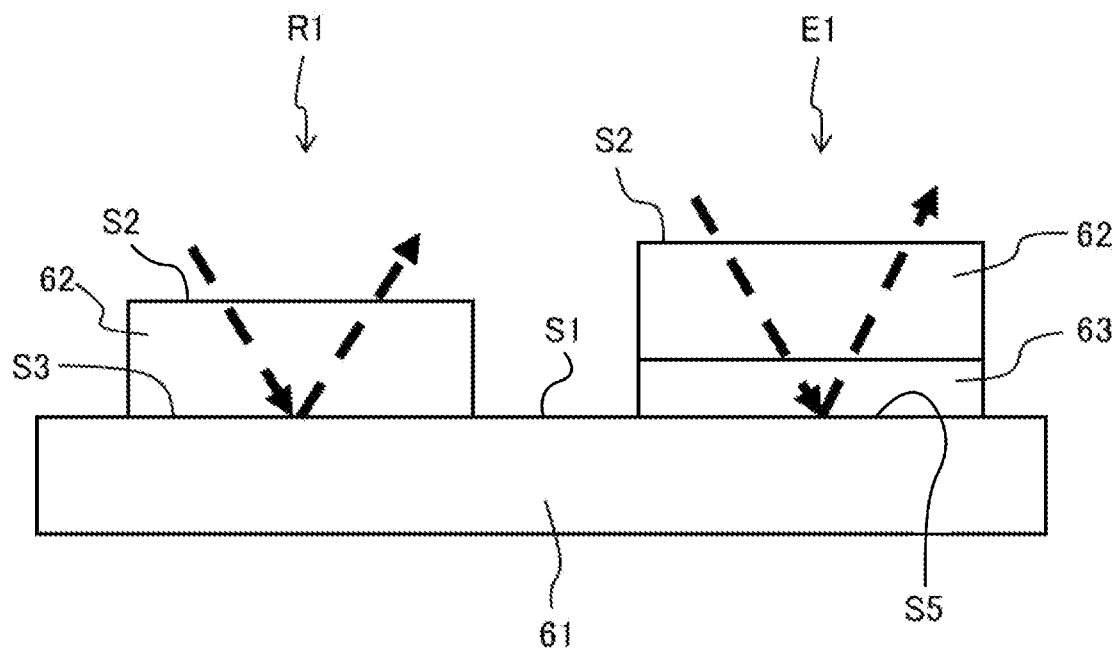
FIG. 5A is a side view illustrating a structure used for measuring reflectivity in a configuration corresponding to the lens barrel, the lens, and the light absorber of the lens with the lens barrel.
Figure 5B:
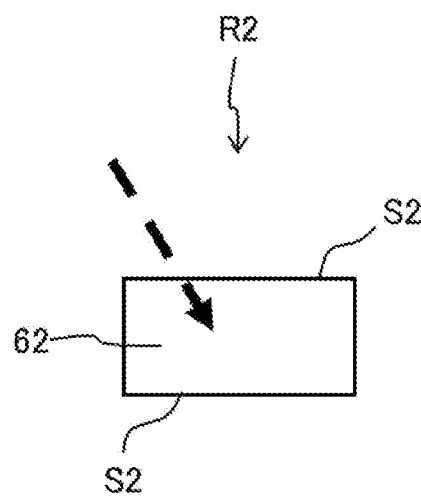
FIG. 5B is a side view illustrating a structure used for measuring reflectivity in a configuration corresponding to the lens barrel, the lens, and the light absorber of the lens with the lens barrel.
Figure 5C:
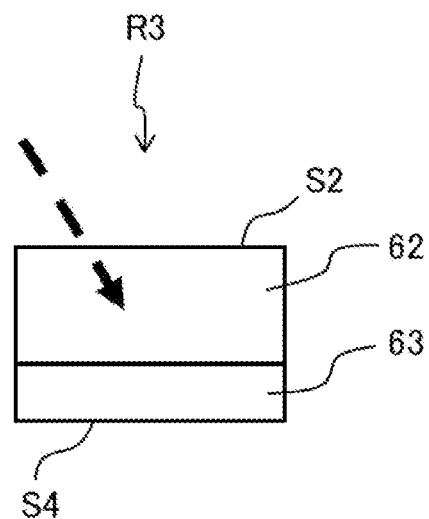
FIG. 5C is a side view illustrating a structure used for measuring reflectivity in a configuration corresponding to the lens barrel, the lens, and the light absorber of the lens with the lens barrel.

As a configuration corresponding to the lens with the lens barrel 10 of the above-described embodiment, the configurations E1, R1, R2, and R3 illustrated in FIGS. 5A, 5B, and 5C were provided. The degree of reflection of light incident on the configuration was measured in each layer.

In the first reference configuration R1 illustrated on the left side of FIG. 5A, K-PBK40 (model number) (glass transition point: 501° C., deformation point: 549° C., softening point: 626° C.) manufactured by Sumida Optical Glass, Inc., having a diameter of 6 mm and a thickness of 2.1 mm, was placed on top of an aluminum metal mirror 61 as a glass layer 62 corresponding to the lens 30.

In the configuration E1 as Example 1 of the above-described embodiment illustrated to the right side of FIG. 5A, a filter layer 63 corresponding to the light absorber 40 was placed on the metal mirror 61 corresponding to the lens barrel 20, and the glass layer 62 corresponding to the lens 30 was placed on the filter layer 63. In this configuration E1, the metal mirror 61 was shared with the first reference configuration R1. The filter layer 63 was near-infrared absorption filter SCM504 (model number) (glass transition point: 508° C., deformation point: 556° C., softening point: 620° C. (expected value)) with a square of 5 mm×5 mm in a planar view and a thickness of 1 mm, manufactured by Sumida Optical Glass Co., Ltd. The glass layer 62 had the same configuration as the glass layer 62 of the first reference configuration R1 and used K-PBK40 manufactured by Sumida Optical Glass, Inc.

Here, K-PBK40 (the glass layer 62) and the near infrared absorption filter SCM 504 (the filter layer 63) overlapped each other in the temperature range from the deformation point to the softening point. Specifically, the temperature range of 64° C. from the deformation point 556° C. to the softening point 620° C. of the near infrared absorption filter SCM 504 was included in the temperature range from the deformation point 549° C. to the softening point 626° C. of K-PBK 40.

The second reference configuration R2 for comparison illustrated in FIG. 5B was a glass layer 62 having the same configuration as the glass layer 62 of the first reference configuration R1.

The third reference configuration R3 for comparison illustrated in FIG. 5C was a configuration in which the metal mirror 61 was not provided in the configuration E1 as Example 1. Specifically, the glass layer 62 was mounted on the filter layer 63.

Reflectivity was measured for the above configuration E1, R1 to R3 under the following conditions.

Measuring equipment: a refractivity measurement function of industrial microscope USPM-RU (manufactured by Olympus Corporation) was used, and the reflectivity was measured by focusing on the surface to be measured.

Measurement light: an incident angle of 45 degrees, and a spot diameter of 0.1 mm Wavelength range of measured light: 380 nm to 800 nm In each of the above configurations E1 and R1 to R3, the glass layer 62 was placed at the top of the structure. As indicated by the dashed arrows, the measurement light was incident on the top surface of the glass layer 62.

The target surface for measurement was as follows.
S1: a top surface of the metal mirror 61 (FIG. 5A)
S2: a top surface or a bottom surface of the glass layer 62 (FIGS. 5A, 5B, and 5C)
S3: a boundary between the metal mirror 61 and the glass layer 62 (FIG. 5A)
S4: a bottom surface of the filter layer 63 of the third reference configuration R3 (FIG. 5C)
S5: a boundary between the metal mirror 61 and the filter layer 63 (FIG. 5A)

The above-described measurement target surfaces S3 and S5 were simulated under the following conditions to calculate the simulated value of the reflectivity for light in the wavelength range of 380 nm to 800 nm.

(1) Simulated value SS3 for the measurement target surface S3:

"Reflectivity between the glass layer 62 and the metal mirror 61"×"Transmittance between both sides of the glass layer 62"×"Absorption coefficient of the glass layer 62"

(2) Simulation value SS5 for the measurement target surface S5:

"Reflectivity among the glass layer 62, the filter layer 63, and the metal mirror 61"×"Transmittance between both sides of the glass layer 62"×"Absorption coefficient of the glass layer 62"

Figure 6:
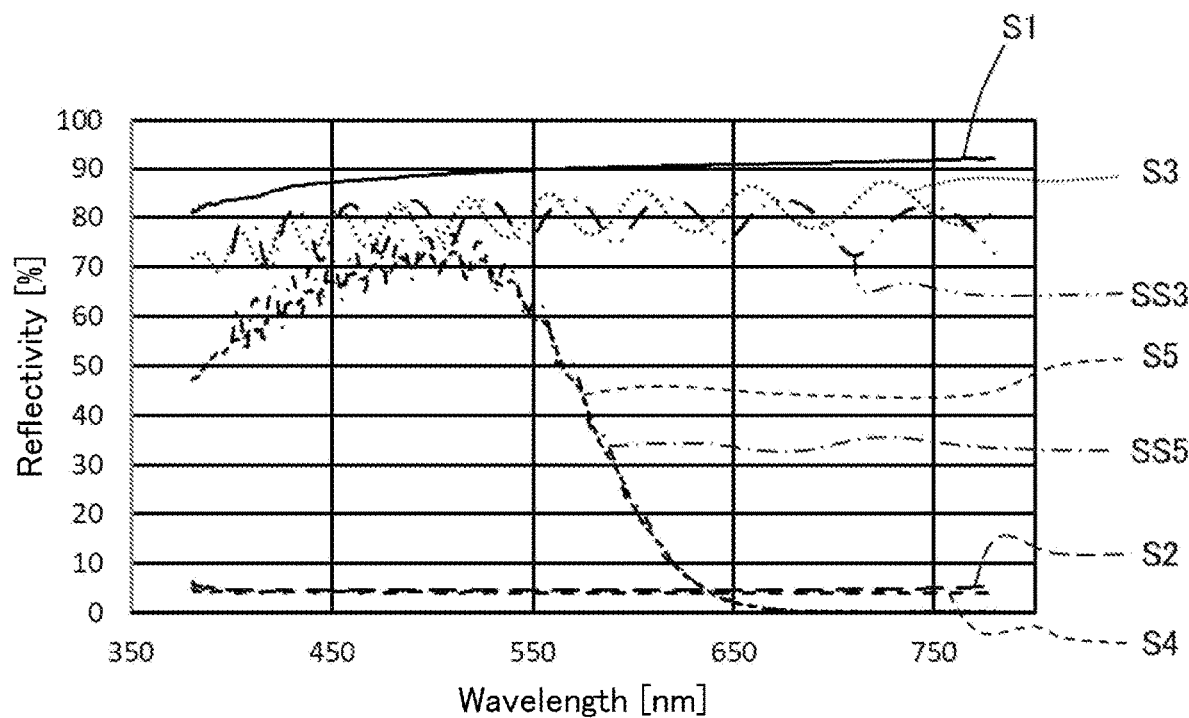
FIG. 6 is a graph illustrating change in reflectivity to the wavelength of the measured light and the change in simulated values of the reflectivity in the configuration illustrated in FIGS. 5A, 5B, and 5C.

FIG. 6 is a graph illustrating a change in the reflectivity to the wavelength of the measured light and a change in the reflectivity in the simulation values SS3 and SS5 in the measurement target surfaces S1 to S5 of the configuration illustrated in FIG. 5A, FIG. 5B, and FIG. 5C.

As illustrated in FIG. 6, the reflectivity at the measurement target surface S3 in the first reference configuration R1 and the corresponding simulation value SS3, that is, the reflectivity at the boundary between the metal mirror 61 and the glass layer 62, was as high as 70% or more over the entire wavelength range, that is closer to the reflectivity at the measurement target surface S1 which is the top surface of the metal mirror 61.

The reflectivity of the measured target surfaces S2 and S4 was as low as about 5% over the entire wavelength range.

Meanwhile, the reflectivity at the measurement target surface S5 in the configuration E1 as Example 1 and the corresponding simulation value SS5, that is, the reflectivity at the boundary between the metal mirror 61 and the filter layer 63 decreased sharply in the wavelength range of greater than 550 nm, and was almost zero in the red region and the near-infrared region of greater than 650 nm. Accordingly, when the glass layer 62 is disposed through the filter layer 63 on the metal mirror 61 exhibiting high reflectivity, it has been found that light incident on the filter layer 63 from the glass layer 62 is absorbed by the optical absorption function of the filter layer 63 in the near-infrared region, so that almost no light is returned to the glass layer 62.

Example 2

Figure 7:
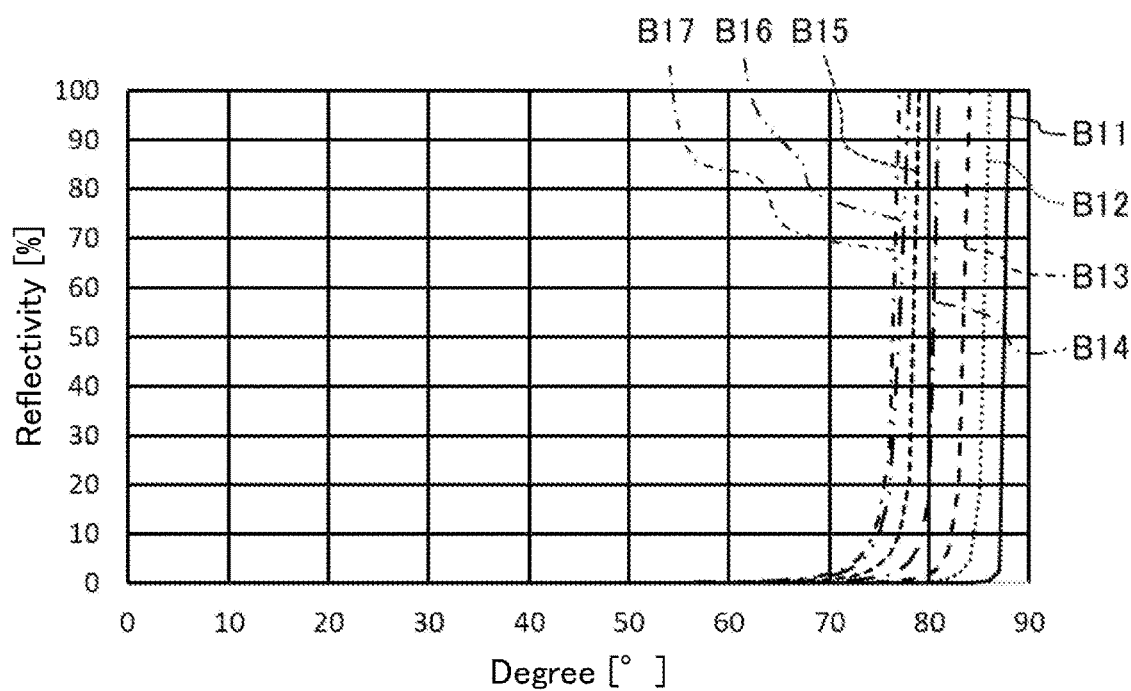
FIG. 7 is a graph illustrating the change in reflectivity of a bonding interface with respect to the change in an incident angle to the surface of the sample when the measured light is incident on the surface of the sample formed by bonding between two glass plates having different refractive indices.
Figure 8:
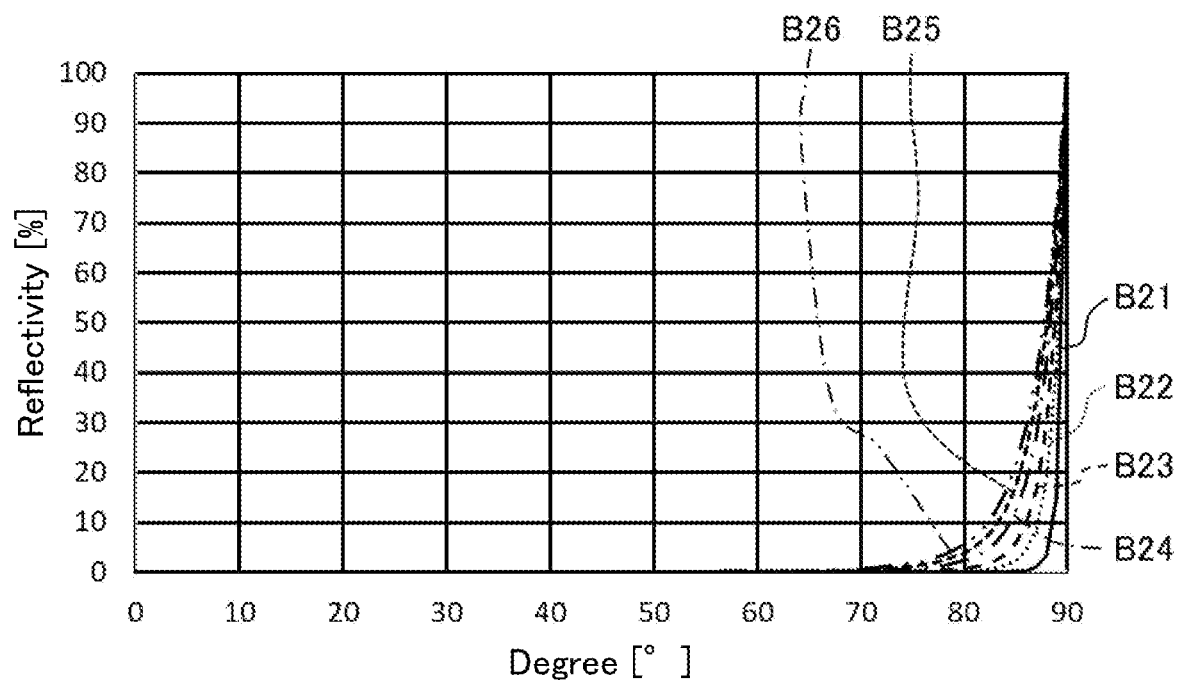
FIG. 8 is a graph illustrating the change in reflectivity of a bonding interface with respect to the change in an incident angle to the surface of the when the measured light is incident on the surface of the sample formed by bonding between two glass plates having different refractive indices.
Figure 9:
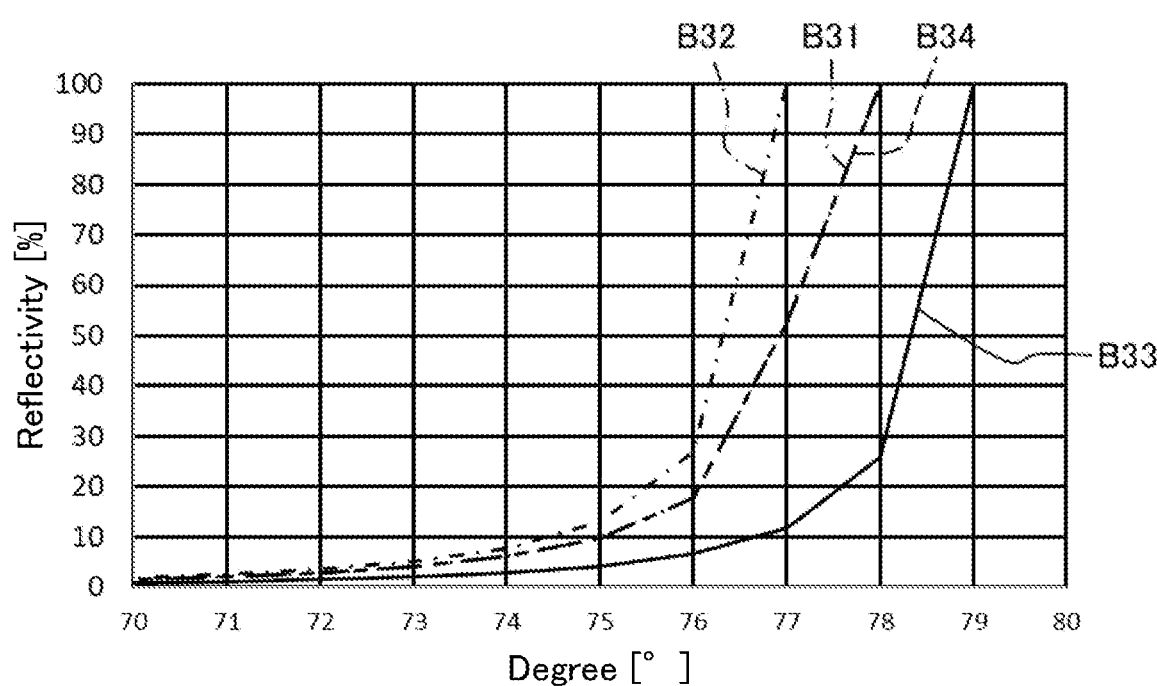
FIG. 9 is a graph illustrating the change in reflectivity of a bonding interface with respect to the change in an incident angle to the surface of the when the measured light is incident on the surface of the sample formed by bonding between two glass plates having different refractive indices.

Next, the effect of the difference in refractive index of two adjacent materials on the reflectivity will be described with reference to FIGS. 7 to 9. FIGS. 7 to 9 are graphs illustrating the result of simulating the change in the reflectivity (longitudinal axis, unit: %) of the reflected light from the adhered surface with respect to the change in the angle of incidence (horizontal axis, unit: degrees) on the surface of the sample, when the measurement light is incident on the surface of the sample consisting of two glass plates with different refractive indices bonded to each other (Example 2).

The refractive indices of the samples in FIGS. 7, 8, and 9 are as illustrated in Tables 1, 2, and 3 below, respectively. The samples B11 to B17 illustrated in FIG. 7 and the samples B31 to B34 illustrated in FIG. 9 were configured so that the refractive index n1 of the glass plate on the incident side, that is, the first glass plate is higher than the refractive index n2 of the second glass plate. The samples B21 to B26 illustrated in FIG. 8 were configured so that the refractive index n2 of the second glass plate is higher than the refractive index n1 of the glass plate on the incident side.

For the samples illustrated in FIG. 7 and Table 1, the ratio (unit: %) of |n1−n2| (absolute value of the difference between n1 and n2) to n1 increased in the order of B11, B12, B13, B14, B15, B16, and B17, and the value |n1−n2| was identical in B16 and B17.

As illustrated in FIG. 7, in any sample, the reflectivity was zero in the range of 0 degrees to 60 degrees of incident angle. The sample B17 which is the highest ratio of |n1−n2| to n1 increased in reflectivity from around 70 degrees of incident angle, and had a reflectivity of 100% (total reflection) at around 76 degrees of incident angle. The incident angle at which the reflectivity started to increase was larger as the ratio of |n1−n2| to n1 becomes smaller. The smaller the ratio, the larger the incident angle at which the reflectivity was 100%, that is, the total reflection started.

According to this result, in the samples B11 to B16 in which the ratio of |n1−n2| to n1 was 2.5% or less, the reflectivity became 100% when the incident angle was around 80 degrees or more. Therefore, in a configuration in which the light absorber 40 was disposed outside the lens 30 in its radial direction, as in the case of the lens with the lens barrel 10 of the above-described embodiment, most of the light incident from the lens 30 to the light absorber 40 is believed to be incident at an incidence angle less than 80 degrees. Therefore, an effect, such that a strong reflection or total reflection at the boundary between the lens 30 and the light absorber 40 can be reduced, can be expected.

TABLE 1

| Sample No. | Refractive index | | Difference of refractive index | |
|---|---|---|---|---|
| | First glass plate (on the side of light incident) (Refractive index n1) | Second glass plate (Refractive index n2) | Ratio (%) of \|n1 − n2\| to n1 | \|n1 − n2\| |
| B11 | 1.561 | 1.56 | 0.064 | 0.001 |
| B12 | 1.565 | 1.56 | 0.319 | 0.005 |
| B13 | 1.57 | 1.56 | 0.637 | 0.01 |
| B14 | 1.58 | 1.56 | 1.266 | 0.02 |
| B15 | 1.59 | 1.56 | 1.887 | 0.03 |
| B16 | 1.60 | 1.56 | 2.50 | 0.04 |
| B17 | 1.49 | 1.45 | 2.685 | 0.04 |

For the samples illustrated in FIG. 8 and Table 2, the ratio (unit: %) of |n1−n2| to n1 as a difference in refractive index became larger in the order of B21, B22, B23, B24, B25, and B26.

As illustrated in FIG. 8, in any sample, the reflectivity was zero in the range of 0 degrees to 70 degrees of incident angle. The sample B26 having the highest ratio of |n1−n2| to n1 increased reflectivity from around 75 degrees of incident angle, and has a reflectivity of 100% (total reflection) at around 90 degrees of incident angle. The smaller the ratio of |n1−n2| to n1, the larger the incident angle at which the reflectance started to increase. In addition, the incident angle, at which the reflectivity of 100% (total reflection) was reached, was 90 degrees for all samples, and the total reflection did not occur for angles less than 90 degrees.

According to this result, in the samples B21 to B25 in which the ratio of |n1−n2| to n1 was 2.5% or less, the reflectivity started to increase when the incident angle was around 80 degrees or more. Therefore, in a configuration in which the light absorber 40 was disposed outside the lens 30 in its radial direction, as in the case of the lens barrel 10 of the above-described embodiment, most of the light incident from the lens 30 to the light absorber 40 is believed to be incident at an incidence angle less than 80 degrees. Therefore, an effect, such that a strong reflection at the boundary between the lens 30 and the light absorber 40 can be reduced, can be expected.

TABLE 2

| Sample No. | Refractive index | | Difference of refractive index | |
|---|---|---|---|---|
| | First glass plate (on the side of light incident) (Refractive index n1) | Second glass plate (Refractive index n2) | Ratio (%) of \|n1 − n2\| to n1 | \|n1 − n2\| |
| B21 | 1.56 | 1.561 | 0.064 | 0.001 |
| B22 | 1.56 | 1.565 | 0.321 | 0.005 |
| B23 | 1.56 | 1.57 | 0.641 | 0.01 |
| B24 | 1.56 | 1.58 | 1.282 | 0.02 |
| B25 | 1.56 | 1.59 | 1.923 | 0.03 |
| B26 | 1.56 | 1.60 | 2.564 | 0.04 |

For the samples illustrated in FIG. 9 and Table 3, the ratio (unit: %) of |n1−n2| to n1 as a difference in refractive index was 2.5 for B31 and B34, greater than 2.5 for B32, and less than 2.5 for B33. The value |n1−n2| was identical in B31, B32, and B33.

As illustrated in FIG. 9, the sample B32 having the highest ratio of |n1−n2| to n1 increased reflectivity from around 70 degrees of incident angle, and has a reflectivity of 100% (total reflection) at around 77 degrees of incident angle. The smaller the ratio of |n1−n2| to n1, the larger the incident angle at which the reflectance started to increase, and the same applied to the incident angle at which the reflectivity was 100%, that is, the total reflection started.

According to this result, in the samples B31, B33, and B34 in which the ratio of |n1−n2| to n1 was 2.5% or less, the reflectivity became 100% when the incident angle was around 78 degrees or more. Therefore, in a configuration in which the light absorber 40 was disposed outside the lens 30 in its radial direction, as in the case of the lens with the lens barrel 10 of the above-described embodiment, most of the light incident from the lens 30 to the light absorber 40 is believed to be incident at an incidence angle less than 78 degrees. Therefore, an effect, such that a strong reflection or total reflection at the boundary between the lens 30 and the light absorber 40 can be reduced, can be expected. In addition, the ratio of |n1−n2| to n1 was 2.5, which was identical in the samples B31 and B34, while the value |n1−n2| was a different value in the samples B31 and B34. However, the samples indicated almost the same change in FIG. 9.

TABLE 3

| | Refractive index | | Difference of refractive index | |
|---|---|---|---|---|
| | First glass plate | | | |
| Sample No. | (on the side of light incident) (Refractive index n1) | Second glass plate (Refractive index n2) | Ratio (%) of \|n1 − n2\| to n1 | \|n1 − n2\| |
| B31 | 1.60 | 1.56 | 2.50 | 0.04 |
| B32 | 1.49 | 1.45 | 2.68456 | 0.04 |
| B33 | 2.04 | 2.00 | 1.96078 | 0.04 |
| B34 | 1.49 | 1.45275 | 2.50 | 0.03725 |

What is claimed is:

1. A lens, comprising:
a metal lens barrel;
a glass lens disposed in the metal lens barrel; and
a glass light absorber disposed between an inner perimeter surface of the metal lens barrel and an outer perimeter surface of the lens that faces the inner perimeter surface in a radial direction of the metal lens barrel,
wherein a first temperature range from a deformation point to a softening point of a first glass material constituting the lens and a second temperature range from a deformation point to a softening point of a second glass material constituting the light absorber overlap each other, said second glass material being made of near-infrared absorbing glass and absorbing light in a near-infrared region more than the first glass material,
wherein a thicknesses of the glass light absorber and a thickness of the lens in an optical axis direction of the glass lens are the same at a boundary where the glass light absorber and the outer perimeter surface of the lens are joined,
wherein the second temperature range of the second glass material is entirely within the first temperature range of the first glass material, and a differential between an upper limit and a lower limit of the overlap is 10° C. or higher,
wherein a first glass transition point that is a glass transition point of the first glass material, is higher than a second glass transition point that is a glass transition point of the second glass material, and
wherein the glass lens and the glass light absorber are formed within the metal lens barrel simultaneously in a single process.

2. The lens according to claim 1,
wherein a difference of a refractive index between the first glass material and the second glass material is within ±2.5%.

3. The lens according to claim 1,
wherein the lens has a lens surface on at least one of end surfaces in a direction of an optical axis of the lens to exert a predetermined refractive action.

4. The lens according to claim 3,
wherein a surface formed by the second glass material disposed continuously with the lens surface is positioned between the lens surface and the metal lens barrel.

5. The lens according to claim 3,
wherein the lens includes a central portion having the lens surface and a periphery disposed at an outer edge of the central portion in a radial direction of the lens, and
wherein a ratio of a thickness in the optical axis direction of the light absorber to a thickness of the periphery is 0.8 or greater.

6. A lens, comprising:
a metal lens barrel;
a glass lens disposed in the metal lens barrel; and
a glass light absorber disposed between an inner perimeter surface of the metal lens barrel and an outer perimeter surface of the lens that faces the inner perimeter surface in a radial direction of the metal lens barrel,
wherein a first temperature range from a deformation point to a softening point of a first glass material constituting the lens and a second temperature range from a deformation point to a softening point of a second glass material constituting the light absorber overlap each other, said second glass material being made of near-infrared absorbing glass and absorbing light in a near-infrared region more than the first glass material,
wherein the glass light absorber has surfaces that face in an optical axis direction of the glass lens, each being continuous with respective end surface of the lens that faces in the optical axis direction without overlapping the respective end surface of the lens in the optical axis direction of the glass lens,
wherein the second temperature range of the second glass material is entirely within the first temperature range of the first glass material, and a differential between an upper limit and a lower limit of the overlap is 10° C. or higher,
wherein a first glass transition point that is a glass transition point of the first glass material, is higher than a second glass transition point that is a glass transition point of the second glass material, and
wherein the glass lens and the glass light absorber are formed within the metal lens barrel simultaneously in a single process.

* * * * *